United States Patent
Sterling et al.

(10) Patent No.: US 7,398,284 B2
(45) Date of Patent: Jul. 8, 2008

(54) POLICY BASED SYSTEM MANAGEMENT (75) Inventors: Keith Sterling, London (GB); Richard Hughes, London (GB); Allan Jenkins, London (GB); William Box, London (GB); Ian Middleton, London (GB)

(73) Assignee: Jacobs Rimell Limited, London (GB)

( * ) Notice: Subject to any disclaimer, the term of this patent is extended or adjusted under 35 U.S.C. 154(b) by 70 days.

(21) Appl. No.: 10/492,552

(22) PCT Filed: Oct. 15, 2002

(86) PCT No.: PCT/GB02/04666
§ 371 (c)(1),
(2), (4) Date: Oct. 22, 2004

(87) PCT Pub. No.: WO03/034207
PCT Pub. Date: Apr. 24, 2003

(65) Prior Publication Data
US 2005/0038765 A1  Feb. 17, 2005

(30) Foreign Application Priority Data
Oct. 15, 2001  (GB)  .................. 0124701.4

(51) Int. Cl.
*G06F 17/30* (2006.01)
(52) U.S. Cl. .................. 707/201; 707/10; 707/100
(58) Field of Classification Search .......... 707/101, 707/104.1, 10, 100, 8, 201; 709/203

See application file for complete search history.

(56) References Cited

U.S. PATENT DOCUMENTS

| 6,243,747 | B1 | 6/2001 | Lewis et al. | |
| 2002/0082892 | A1* | 6/2002 | Raffel et al. | 705/8 |
| 2002/0155843 | A1* | 10/2002 | Bahl et al. | 455/456 |
| 2002/0174207 | A1* | 11/2002 | Battou | 709/223 |
| 2002/0178380 | A1* | 11/2002 | Wolf et al. | 713/201 |
| 2003/0005101 | A1* | 1/2003 | Falzon | 709/223 |
| 2003/0145041 | A1* | 7/2003 | Dunham et al. | 709/203 |

FOREIGN PATENT DOCUMENTS

| WO | WO 02/35312 | 5/2002 |

\* cited by examiner

*Primary Examiner*—Cheryl Lewis
(74) *Attorney, Agent, or Firm*—Stites & Harbison, PLLC; David W. Nagle, Jr.

(57) ABSTRACT

A method of management of concurrent sessions within a networked electronic system across multiple servers generally comprises defining a model of the system to be managed, and then defining policies, which policies are applicable to components of the model. Then, system components are modelled as entities in the model with hierarchical relationships between the entities. The entities each comprise a single physical or non-physical object in the system. The model is split into parts such that policy information for a given entity is held on a nominated server, with other servers being informed of where to find the policy information, determination of which policies to apply to a given request being made by a policy checker, which policies are then executed.

15 Claims, 7 Drawing Sheets

POLICY BASED SYSTEM MANAGEMENT

CROSS-REFERENCE TO RELATED APPLICATIONS

The present application is a national stage filing of PCT International Application No. PCT/GB02/04666 filed on Oct. 15, 2002, and further claims priority to GB Application No. 0124701.4 filed on Oct. 15, 2001.

FIELD OF THE INVENTION

The invention relates to a method of management of concurrent sessions within an electronic system.

BACKGROUND OF THE INVENTION

Electronic systems are widely used to provide all manner of services to both corporate and consumer markets. Typically, these systems offer services as packages, providing a different level of service to the end customer. Some systems even provide a level of service which is customisable down to the level of an individual user of such systems. This is generally referred to as a service level agreement (SLA). Service providers typically use policy based management so that various kinds of traffic such as voice, data or video receive the priority in terms of bandwidth availability that the respective SLA mandates. Such SLAs therefore require a mechanism for monitoring system activity, policy management and policy enforcement based on this activity.

The activity of monitoring and the act of enforcement require access to the necessary functionality of the components within the system environment. This is a simple issue of integration as access to these components is achieved through open or known proprietary interfaces. However, the task of modelling the instantaneous state of the system in a way that policy enforcement may be executed is not.

Current policy management systems simply take a network element view using a policy decision point server to control the policy enforcement points (routers, switches etc) using access control lists or queue management software.

One such system which takes a network element view is disclosed in U.S. Pat. No. 6,243,747 which discloses a method for enforcing polices for configuration management in communication networks in which a database of models is provided, each model representing a network device and includes attribute values for the parameters of the network device. The method defines network groups and policies for these groups, determines and resolves conflicts between the groups.

SUMMARY OF THE INVENTION

The present invention seeks to provide a method of managing and enforcing policies based upon the current state of a system, in particular for a system where the infrastructure of the system is globally distributed.

According to the invention there is provided a method of management of concurrent sessions within a networked electronic system comprising defining a model of the system to be managed, defining policies, which policies are applicable to components of the model, wherein system components are modelled as entities in the model with hierarchical relationships between the entities, which entities each comprise a single physical or non-physical object in the system, wherein policies are enforced in response to interactions between entities within the system.

Preferably, the entities may comprise a plurality of physical or non-physical objects to which a common policy is applicable. Preferably, entities are grouped into sets having a common theme. Preferably, each entity is defined as local or distributed, wherein state information for a local entity is located only at a pre-defined server and associated back-up servers and wherein state information for a distributed entity is accessible to servers throughout the system. Preferably, representation of the model comprises views, which views relate to a single object type. Preferably, usage of the system components by a plurality of users is monitored and policies define what the or each user is entitled to do, which policies are defined in response to usage of system components by the or each user.

Advantageously, policy management is not dependent on any pre-defined concept so that policies may be applied to anything that may be modelled as an entity within the policy model. The abstraction away from the network element approach has proved advantageous. This flexibility is provided by the data model and the methods used to construct the policy model. Additionally, by maintaining system usage and applying and enforcing policies in response to this usage, the policy server of the invention makes the electronic system less liable to misuse.

BRIEF DESCRIPTION OF THE DRAWINGS

An exemplary embodiment of the invention will now be described in greater detail with reference to the drawings in which.

DETAILED DESCRIPTION OF THE INVENTION

Figure 1:
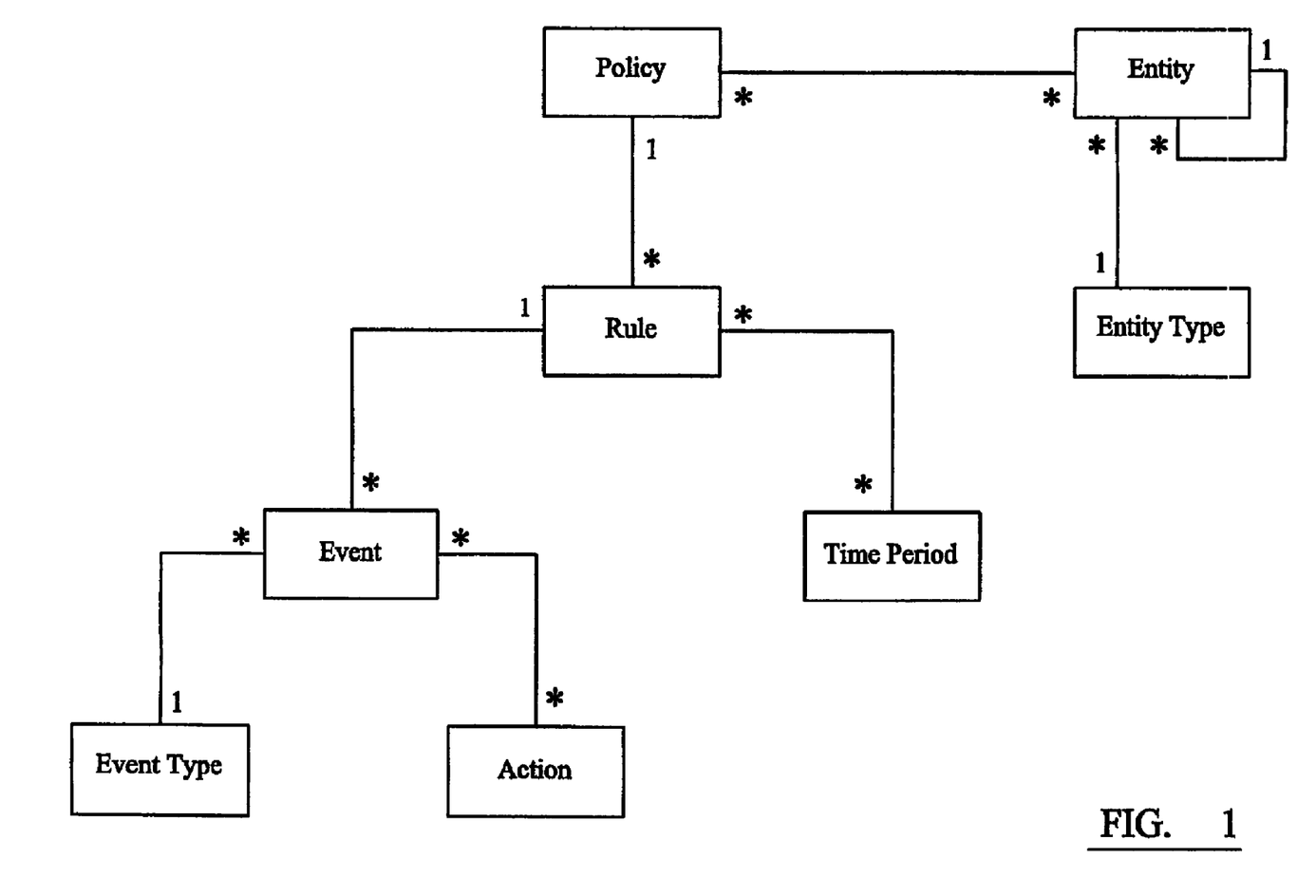
FIG. 1 shows a schematic representation of the data model.

FIG. 1 shows a schematic representation of the data model. In an environment requiring the management of concurrent sessions, such as a virtual ISP or vISP, the invention can be used to monitor usage and enforce policies that have been applied to elements, services, geographic regions, users or any other abstract notion.

In general, a policy model can be defined as comprising two distinct parts:

1. A model of the system environment, known as the environment model;
2. Policies applicable to the environment model The first step in the process of defining an environment model, and hence a policy model, is to determine what the aim of policy management within the system environment is. Once this is established, the implementation can be developed.

An example of an aim might be: "to manage concurrent session access in a network access environment".

The next step required in the definition of an environment model is the analysis of the system environment. This analysis will typically include a breakdown (into elements) of any infrastructure—either hardware or software, and might also include a description of how the system fits into the overall business or strategic objectives of the organisation. Such concepts, which, for example, might include products and services, may be required within the model depending upon the aim of policy management within this system.

The environment model is defined using a simple data model, where system components are modelled as entities in the environment model with hierarchical relationships.

An entity may represent one of two broad classes:
1. A single physical or non-physical object—for example, an end-user; or
2. A collection of physical or non-physical objects may be represented as a group—for example, a number of objects might be 'grouped' together in order to apply a policy across them as a common set.

An entity may have no children, or one, two or many. It may also have no parents, or one, two or many.

An example of an entity within this definition is a service such as a virtual Internet Service Provider, or vISP. Another example is a geographic region, which has multiple child regions such as the 'US' region having child regions 'East Coast' and 'West Coast'.

Once the environment model has been defined, it is necessary to define policies that are applicable to the said environment model. A policy is an administrator-specified directive that manages certain aspects of the desired outcome of interactions within a given system. This system may provide an environment for users, applications, services, and infrastructure or any other quantifiable object which can be modelled as an entity. A policy provides guidelines for how these different entities within such an environment should be managed in response to interactions within the system by each entity.

In its simplest form, a policy is one or more time sensitive rules that describe some action or actions to undertake if certain pre-defined conditions exist (an event). A policy will typically be applied to one or more entities (policy association)—the combination of these entities providing the key to the policy and thus the application of the policy in response to a request referring to these entities.

A prime example of a policy would be a session limit applied to a given vISP entity. This session limit might, for example, limit the number of concurrent sessions for the vISP to a predefined number that may not be exceeded.

A rule provides a logical, determinate method for performing a mathematical operation and obtaining a certain result. Rules comprise one or more input parameters, or arguments, and may generate a number of events in response to the rule being violated.

Rule types are provided by means of plug-in components, typically Java plug-ins, that are managed by the policy server. Parameters for these rule types are required as specified by each individual rule type. An example of a rule would be that if a given state count reaches a predefined limit, then a specified event should occur.

An event is the outcome of a condition being met by a rule. An event can then trigger one or more actions that will then be executed. One or more events may be linked to a single rule. For example, an event would trigger multiple actions such as sending an email, or SNMP-trap in response to being called.

An action is the execution of a predefined process, such as generating an SNMP-trap or email. The process or action type requires identification, as do the parameters passed to the action processor.

An example of an action would be the sending of an email or SNMP-trap to a predefined address with a predefined message.

As indicated earlier, a policy can be applied to one or more entities—the combination of these entities providing the key to the policy and thus the application of the policy in response to a request. Within a policy association there can be only one entity of each type.

An example might be that a given vISP, vISP1, has a limit, X, in the geographical region 'East Coast', and another limit, Y, in the geographical region 'West Coast'—therefore two policies are required, one for each combination.

Figure 2:
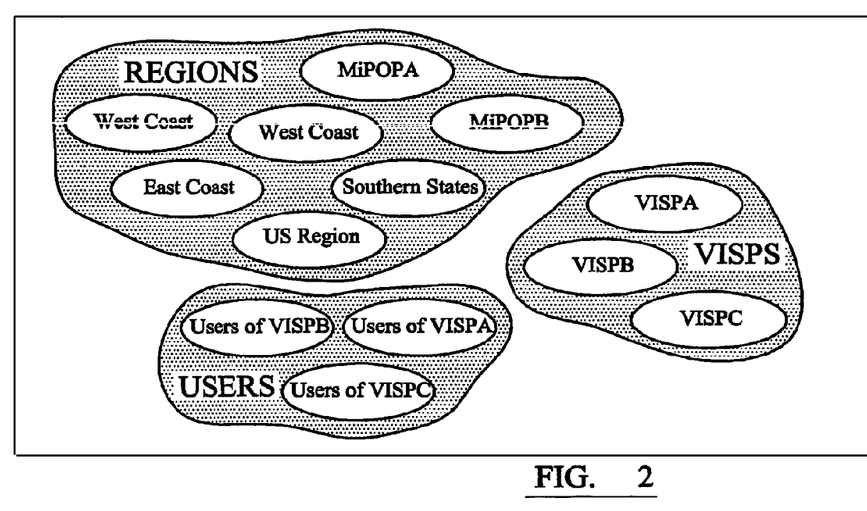
FIG. 2 shows entities that describe the solution environment or system for a virtual ISP infrastructure network.

FIG. 2 shows all the entities that describe the system environment (in this example a virtual Internet Service Provider (vISP) infrastructure network). The entities are grouped into specific sets that share a common theme.

Each of these groupings are known as views. These views provide a means of defining the system to be modelled. In general, views should not overlap; each entity view should provide the basis for some information processing. Views could typically be services, users, or perhaps data.

Each view represents a collection of entities that must be modelled within the policy server. The data model requires that an instance of an entity be of a specific entity type (following standard object-oriented design principles). An entity type is effectively a single view. That is, the view 'VISPS' creates the need for an entity type 'Visp', the view 'REGIONS' creates the need for an entity type 'Region', and so on.

These entity types provide a template for the creation of entities within the policy server. Each entity type requires a definition such as a unique name to identify the entity type.

Each entity is defined with a unique identifier applied to each, along with the appropriate entity type. Additionally, the home server of the entity needs to be identified, along with a backup server for the case where the primary (home) server fails.

Finally, the entity should be defined as either 'local' to the home server or 'distributed'. If the entity is defined as 'local', then any data associated with the entity is located only at the home server (and associated backup server), thus restricting requests to this entity at only the home or backup server (during failover). This is for entities that require no roaming ability across the Policy Model for requests—therefore state information is only required locally and is not distributed across the whole policy server system, generating unnecessary network traffic and load on any of the other policy servers.

However, if the entity is defined as 'distributed', then the data associated with it, although still homed on the local server, is made accessible to all other servers throughout the policy server System. These servers are informed of where to direct requests for the particular entity nominated as distributed. This is for entities that require roaming ability across the whole Policy Model—therefore state information is required across all policy servers, and is replicated by means of an inter-policy server protocol.

Continuing with the example referred to with respect to FIG. 2, the entities that require definition are given as follows:

| Entity | Entity Type | Comments |
| --- | --- | --- |
| U.S. | Region | Geographic region representing 'U.S.' |
| West Coast | Region | Geographic region representing 'West Coast' |
| East Coast | Region | Geographic region representing 'East Coast' |
| Southern States | Region | Geographic region representing 'Southern States' |
| Miami | Region | Geographic region representing 'Miami' |
| MiPOPA | Region | Geographic region representing 'MiPOPA' POP |

-continued

| Entity | Entity Type | Comments |
| --- | --- | --- |
| MiPOPB | Region | Geographic region representing 'MiPOPB' POP |
| VISP1 | vISP | Virtual ISP service (1) |
| VISP2 | vISP | Virtual ISP service (2) |
| VISP3 | vISP | Virtual ISP service (3) |
| UserX | User-Name | User of VISP1 |
| UserY | User-Name | User of VISP2 |
| UserZ | User-Name | User of VISP3 |

The next step is to define relationships between those entities defined in the previous step using Network Associations which are defined, as necessary, within each view.

Figure 3:
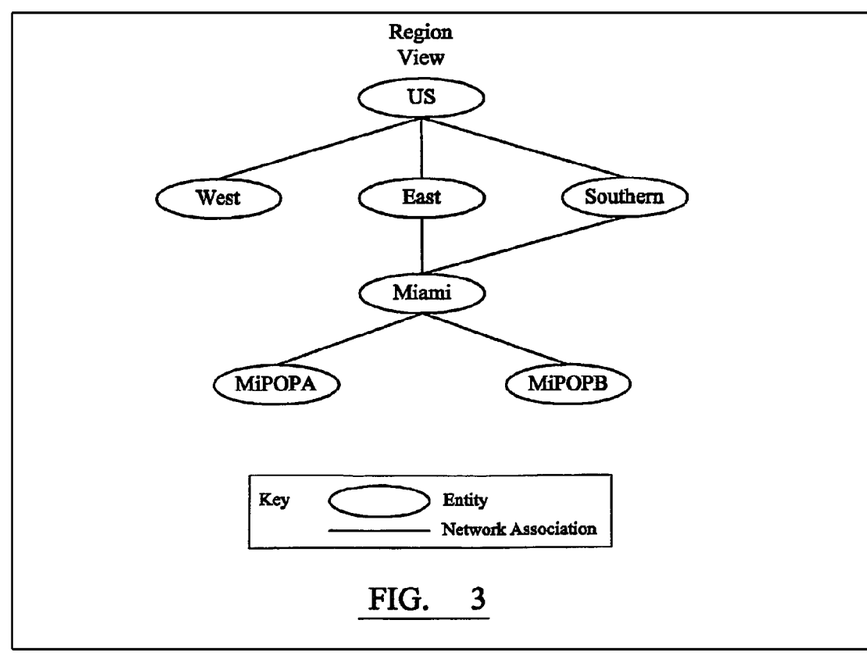
FIG. 3 shows a single view, together with parent-child associations defined between the entities.

FIG. 3 shows a single view, that of 'Region', along with parent-child associations defined between the entities.

A Network Association is defined as simply a parent-child relationship between two entities. Network Associations are used to provide a means of linking entities of the same entity type together, which provides a means of identifying which policies should be applied to a given request.

A typical example of a Network Association would be the relationships between the 'US' entity and the entities 'East Coast' and 'West Coast'. Both of these latter entities are children of the 'US' entity.

The underlying purpose of Network Associations is to provide a means of applying policies at multiple levels. For example, as shown above, Miami is a parent of MiPOPA. It may be required that MiPOPA has a policy applied to it, and that Miami has a policy applied to it also. By using Network Associations, both policies will be applied to a request entering the Policy Model at the MiPOPA entity. However, if the request enters the Policy Model at the Miami entity, then only the Miami policy will be applied. Therefore, it can be clearly seen that a child entity inherits the policies of all parents and grandparent and so on.

Network associations are subtly different to policy associations. Policy associations are not one-to-one relationships between entities, they are effectively a defined collection, or set of entities across views.

Figure 4:
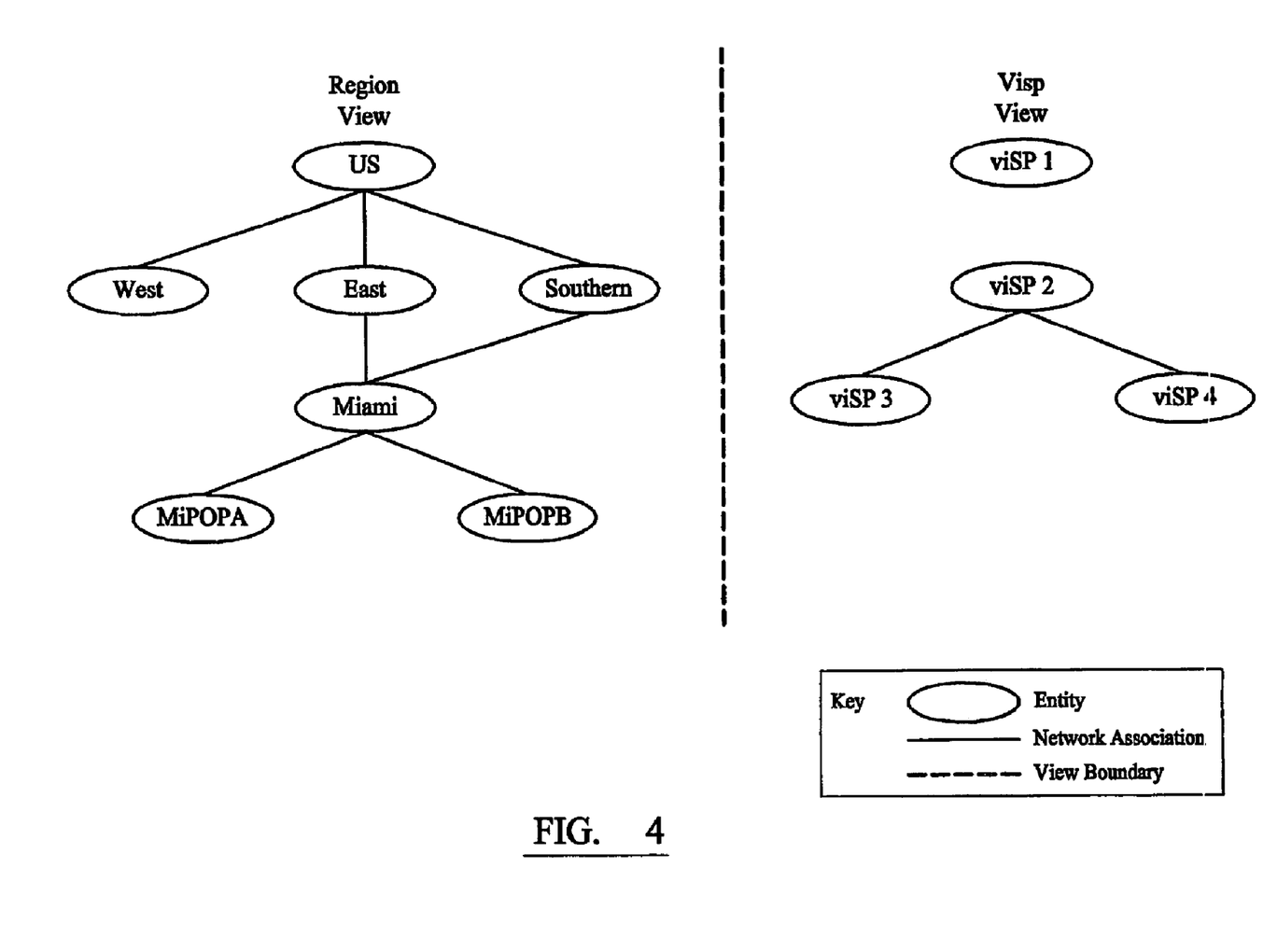
FIG. 4 shows FIG. 3 with an additional view.

FIG. 4 shows the case where another view is introduced into the model. It should be emphasised that only those entities that will have policies applied to them need to be defined in the Environment Model. Any other entities are redundant, although they may provide clarity in the design stages and in the model. For example in FIG. 4, the 'USER' view has been omitted—this is due to the fact that no policies are directly being applied to users. The only policies being applied are those held in the Policy Model, 'Visp' and 'Region' views as shown. In fact, in using the 'service access' plug-in as this example does, user state information is held in a dynamically created (instantiated) object in memory at runtime. However, if there is a requirement to apply policies to individual users, then a 'USER' view would have to be included and policies applied accordingly.

The first step in defining a list of policies is to look at the Environment Model and for each policy, to link the policy together with one or more entities to which it is to be applied. Each policy definition requires a unique policy identifier (label) and a list of these entities.

For example, expanding the previous example the policies that should be applied to entities within the Environment Model should be identified. For example.

| Policy Name | Policy Requirements | Entities |
| --- | --- | --- |
| P1 | Limit concurrent sessions to 20,000 through this region (For usage reporting[1]) | Miami |
| P2 | Limit concurrent sessions to 15,000 through this region (For usage reporting[1]) | MiPOPA |
| P3 | Limit concurrent sessions to 5,000 through this region (For usage reporting[1]) | MiPOPB |
| P4 | Limit concurrent sessions to 50,000 (This is a total limit for VISP3 across the whole Environment Model) | VISP3 |
| P5 | Limit concurrent sessions to 5,000 (Policy Association - this is a limit for VISP3 only when a request is received through the Miami region) | Miami, VISP3 |
| P6 | Limit concurrent sessions to 2,000 (Policy Association - this is a limit for VISP2 only when a request is received through the MiPOPA region) | MiPOPA, VISP2 |
| P7 | Limit concurrent sessions to 2,000 (Policy Association - this is a limit for VISP2 only when a request is received through the MiPOPB region) | MiPOPB, VISP2 |
| P8 | Limit concurrent sessions to 3 (Policy with a wildcard[2] for 'User-Name' entity type - across all users of VISP1 limiting each to 3 concurrent sessions only) | VISP1, *User-Name |

[1]These policies are applied within the 'Region' view to provide a usage reporting/alarm mechanism only, since each POP will be physically limited based on the number of NAS ports available. Therefore, using these policies, when limits are exceeded, events and actions are executed, messaging the appropriate systems.
[2]A wildcard is a construct that enables a policy to be applied to all entities of a specified entity type. It is denoted by use of an asterisk (*). It should be noted that an entity representing this wildcard must be defined within the Environment Model for the appropriate view.

Figure 5:
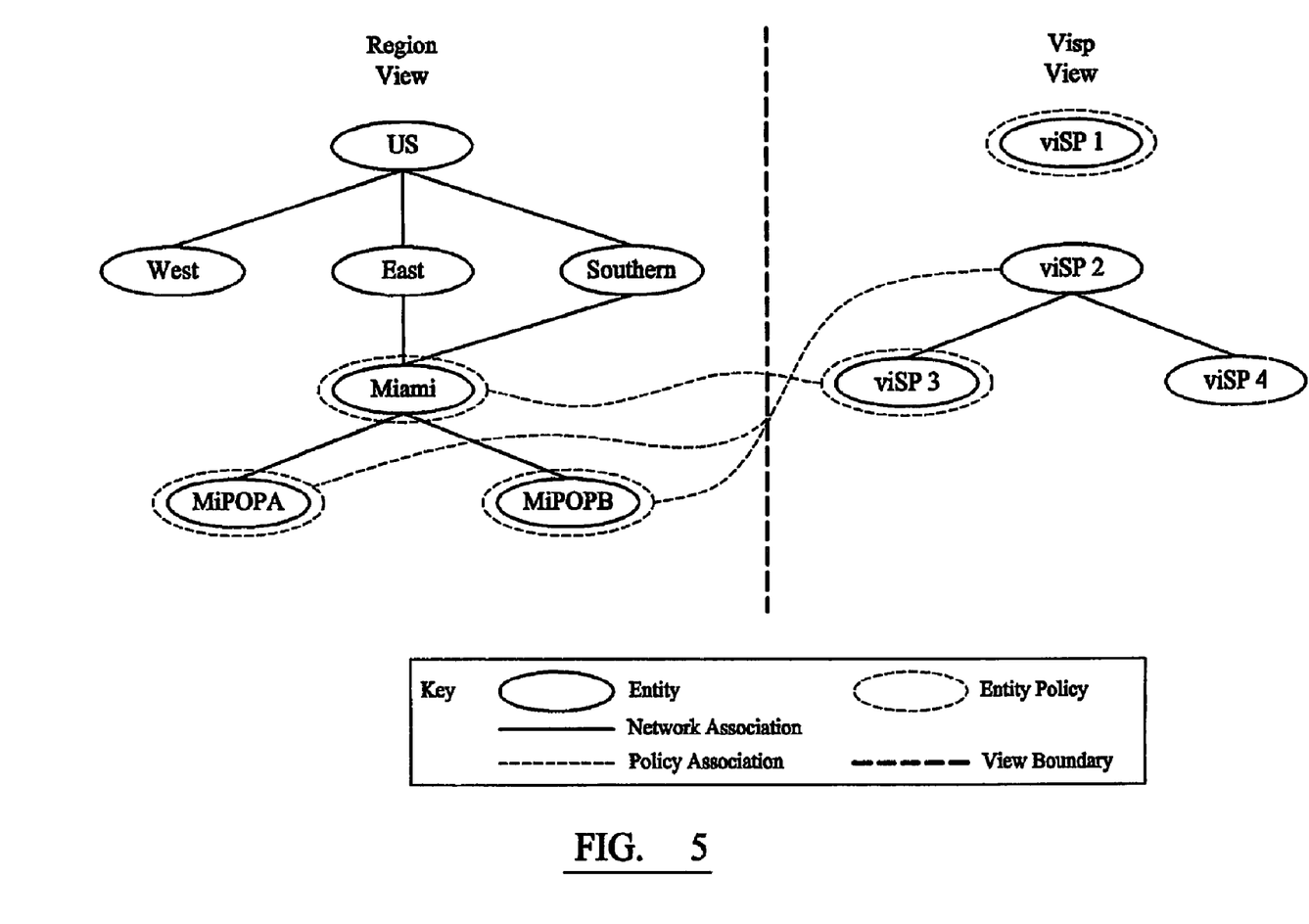
FIG. 5 shows an example of Policy Associations overlaid on the Environment Model.

The link between the views of a Policy Model is provided by means of Policy Associations. The idea here is to associate entities in a manner that provides a unique key to which a policy may be applied, hence the term Policy Association. Each policy is therefore based on a unique set of entities. FIG. 5 shows an example of Policy Associations overlaid on the Environment Model. This is known as the Policy Model.

Should requirements change and the need for policies to be applied to users arise, then a 'User-Name' view must be included and policies applied accordingly.

Figure 6:
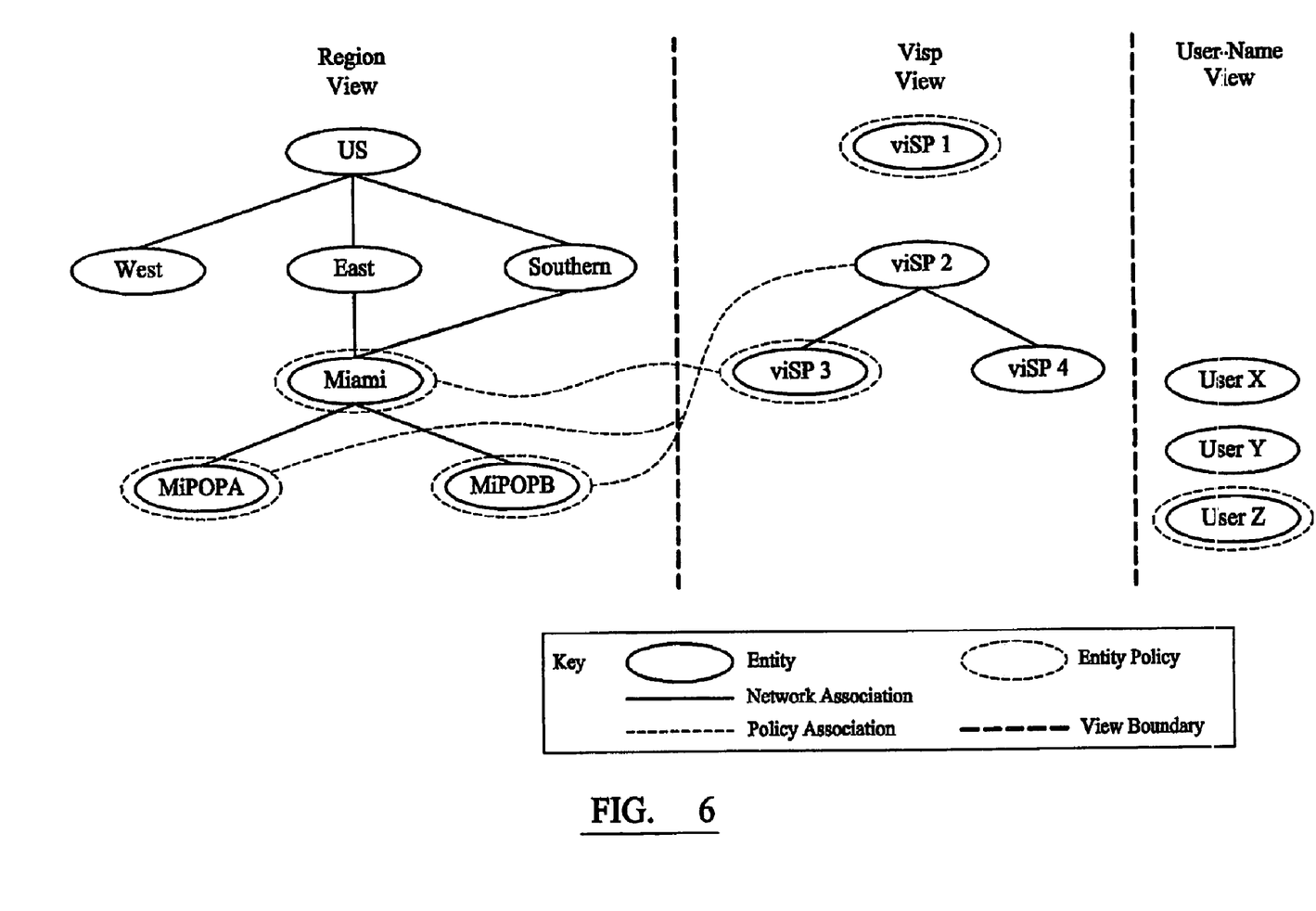
FIG. 6 shows a policy model.

Therefore, extending the model above with a policy applied to a user, UserZ, the Policy Model of FIG. 6 results:

The next step is to translate the textual policy requirements as stated in the above tables into rules, events and actions.

Continuing with the exemplary embodiment a 'service access' rule plug-in would be used for the solution environment we are addressing here. This requires the following rule-specific parameters:

1. Rule identifier (a label for each instance of a rule)
2. A predefined limit
3. A time period during which the policy is active Therefore, the list of policies defined earlier now needs to be expanded, identifying these further parameters.

For example:

| | |
| --- | --- |
| Policy Name | P1 |
| Rule Type | Service Access |
| Limit | 20,000 |
| Time Period | Weekday 9 am to 5 pm |

For each rule, time constraints, events and actions are selected.

Time constraints are supported as periods. A period may be system-default or user-defined. Time constraints are applied to rules in order to restrict the period that a rule is active. For example, it may be desired that a rule only be active between the periods of 9 am to 5 pm on weekdays, therefore a time constraint defining this period should be created and applied to the desired rule or rules.

A set of time periods to constrain the active operation period of rules is defined and then applied to the appropriate rules. Time periods are defined by start time and end time, day of week or date.

For each policy at least one event is usually defined. This is not a requirement though, since it may not be required that an event be generated when a limit is hit—events are generally only used as a reporting/alarm mechanism.

For example, policy P1 might have an event that is triggered when the limit is hit. The purpose of this event being to notify the infrastructure provider that the availability of NAS ports is running critically low.

In response to this limit being hit and the event being triggered, the event generates actions. The process or action type requires identification, as do the parameters passed to the action processor.

In response to an event being triggered for Policy P1, the actions might be to alert an OSS monitor that the limit has been reached using an SNMP-trap, but also to inform the appropriate personnel directly by email that a critical limit has been hit.

The following sections substantially describe the details of how a client request to the policy server is processed in order to determine the appropriate response based upon the policy model.

The first thing to understand is the relationship between a policy server client request and the policy model.

Below is a typical example of a client request (one which relates to the example Policy Model):

| Service | RADIUS |
| --- | --- |
| User-Name | UserZ@VISP3.com |
| Visp | VISP3.com |
| Region | MiPOPA |

[Note: A client request should only comprise a maximum of one entity per entity type per request. The number of entities per request has no defined limit.]

Figure 7:
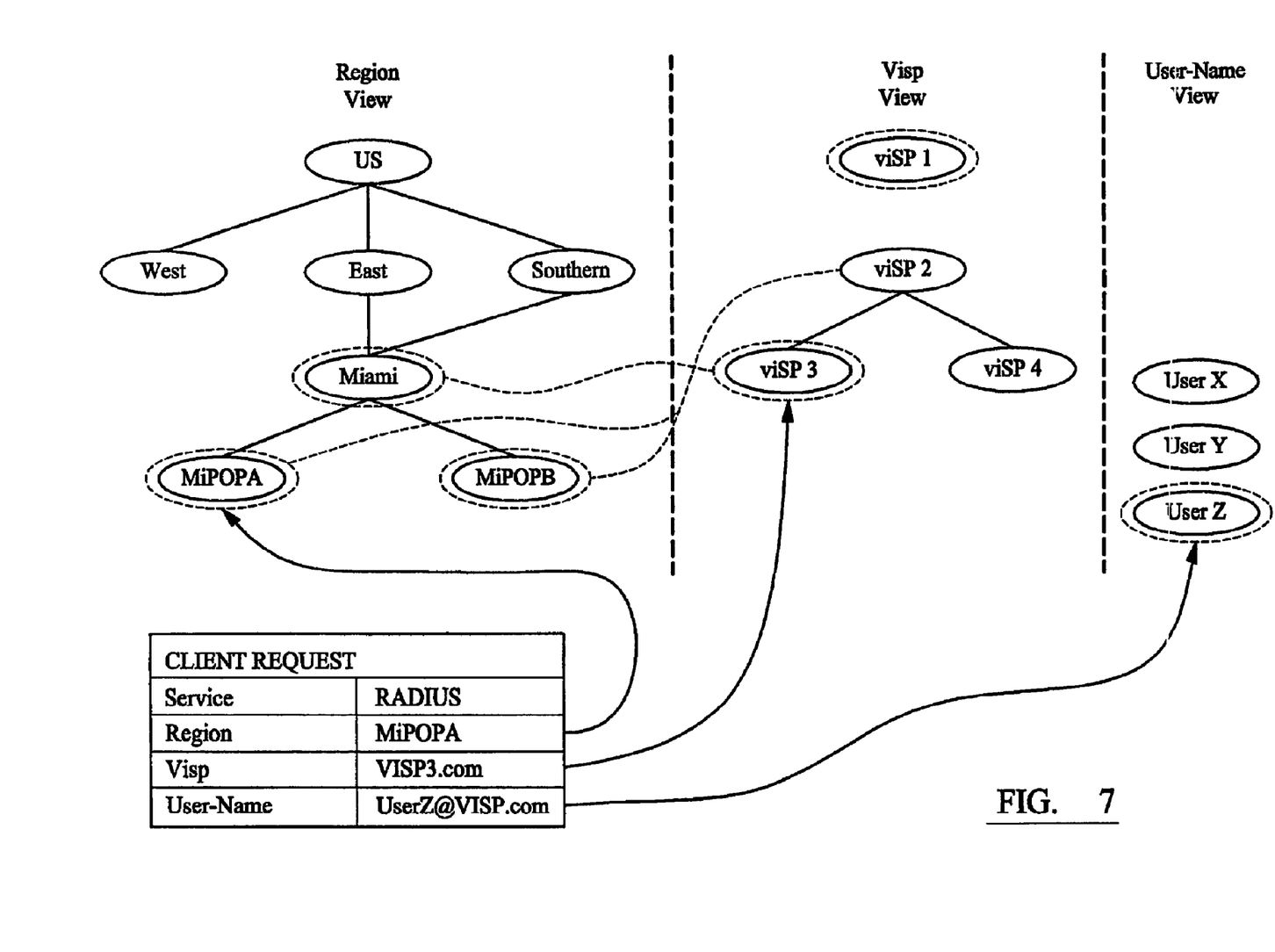
FIG. 7 shows the relationship between a request and the Policy Model
Figure 8:
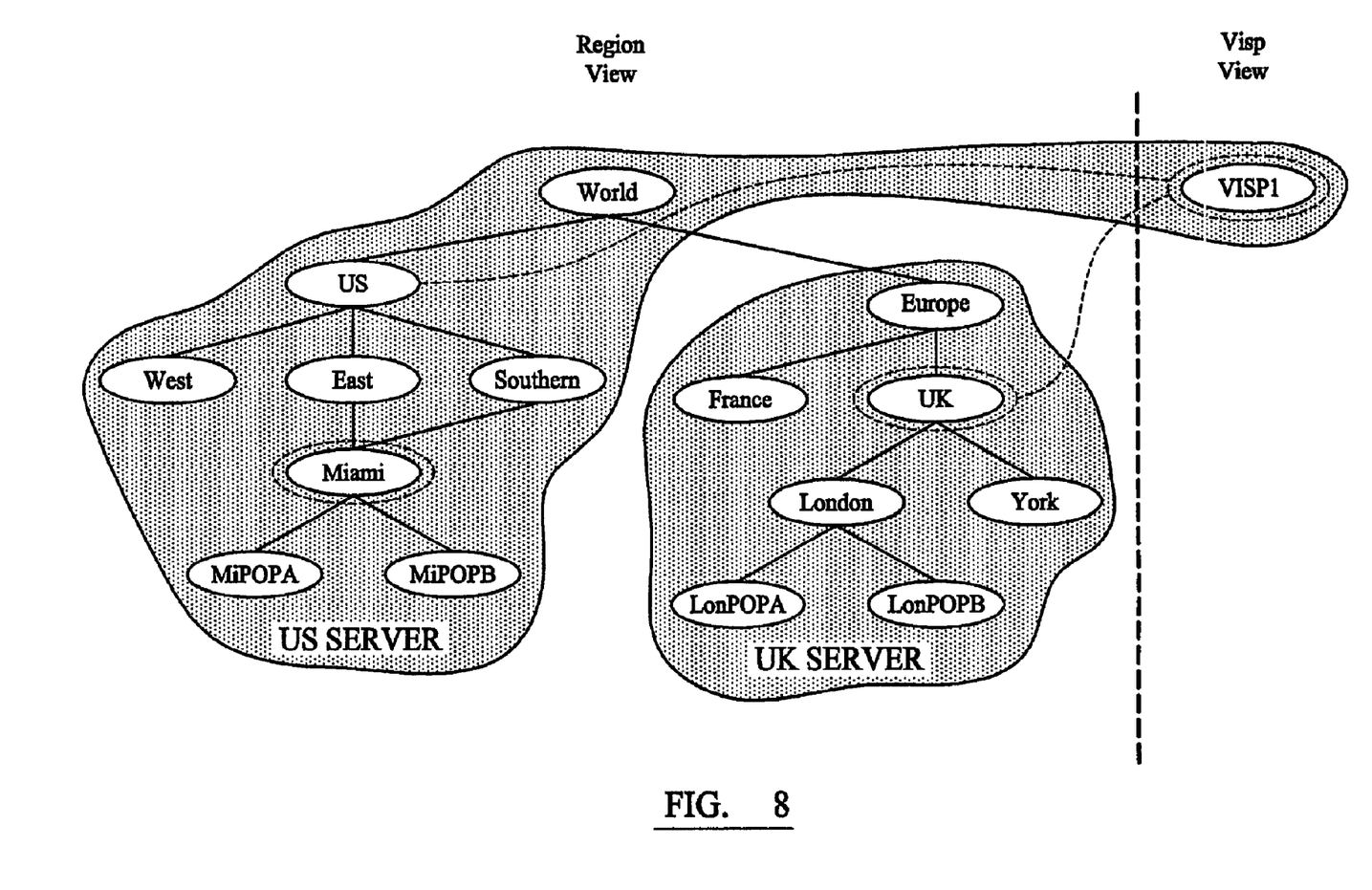
FIG. 8 shows a further policy model.

The relationship between this request and the Policy Model used in the examples throughout this document is shown in FIG. 7. In the Policy Model the label for the Visp would actually be 'VISP3.com', not 'VISP3' as shown in the diagram. Also the label for the User-Name would actually be 'UserZ@VISP3.com', not 'UserZ' as shown in the diagram. Both of these shortened versions were provided for clarity.

From this diagram, it can be clearly seen that each field in the request relates directly to each view in the Policy Model. Therefore, for the given request, the following policies would be applied by the policy server (assuming that they are active as defined by their time constraints):

| Policy Name | Policy Requirements | Entities |
| --- | --- | --- |
| P1 | Limit concurrent sessions to 20,000 through this region | Miami |
| P2 | Limit concurrent sessions to 15,000 through this region | MiPOPA |
| P4 | Limit concurrent sessions to 50,000 | VISP3 |
| P5 | Limit concurrent sessions to 5,000 | Miami, VISP3 |
| P8 | Limit concurrent sessions to 6 for this user | UserZ |

The resulting reply to the client (which initiated the request) will be either an 'accept' or 'decline' message depending upon the aggregate result of all policies applied to the request. I.e. Only when P1, P2, P4, P5 and P8 (example given) all return an 'accept' result does the policy server respond with an 'accept' message to the client—all other combinations will result in a 'decline' message.

The process of determining which policies to apply to a given request based upon the Policy Model is performed by a component called the Policy Checker. In the case where the Policy Model is to be deployed across multiple servers, then the Policy Model should be split into separate parts which relate most closely to the appropriate environment interfaces (RADIUS servers etc). An example of such a scenario might be in the case of an international service that requires high performance and scalability and deals with a heavy load in several geographically diverse locations. Each location might have a server that services all requests for that area.

However, with multi-server deployment and roaming services (distributed), policy information for a given entity is still held on a single, nominated server, but all other servers that form part of the system are informed of where to find the policy information. Roaming requests such as those required by international services can then be processed efficiently and effectively.

All inter-server data exchange is performed using an inter-policy server protocol. The Policy Checker determines the appropriate policies to apply to a given request. Once determined, the core Policy Engine executes the rules in each policy. To achieve this, the Policy Engine must be provided with the appropriate state information associated with each policy as input parameters. This state information is stored on a policy basis on any of the servers in the system. This allocation is determined during policy creation.

Where there is a need to apply a specific policy to a specific set of objects all of which are the same object-type, a default policy is used. A single instance of a default policy may be applied to this single set of object. This enables policies to be applied to a large number of objects without having to explicitly define a policy for each and every object and then apply it to each of them.

Default policies provide a means of applying policies to large numbers of objects of the same type. A default policy is applied to objects by means of selecting their base object-type. This object-type is a typical concept used in object-oriented development, whereby an object is of a particular type as specified by a class. An object is an instantiation of an object class.

Default policies are created dynamically based on a transaction/request. Such policies then handle any future transactions/requests.

The example below provides all the necessary information to explain the process of default policies and their application.

The following features distinguish the approach taken by default policy generation from any other currently proposed in the Policy Management arena:
1. Instances of a single policy definition are generated dynamically in response to a new transaction/request and applied to the object described in the request. The policy used is based upon the class of object to which the request relates.
2. A single policy definition along with the use of object-types provides the means of applying the same policy to large numbers of objects automatically.

A system might consist of the following objects:
Object A, Object B, Object C
Where these objects are of the following object-types:
Object A: Object-type XX
Object B: Object-type YY
Object C: Object-type ZZ
Where each object-type has the following policies assigned to them:
Object-typeXX: PolicyN
Object-typeYY: PolicyO
Object-typeZZ: PolicyP When a transaction/request is received, which consists of a reference to Object A which is of Object-type XX, then an policy of type Policy N is applied to that request, and any subsequent requests made which include a reference to Object A. So in the case where a request is received which consists of a reference to Object A and to Object C, then both policies Policy N and Policy P are applied to the request. The term 'applied' implies that a unique instance of the indicated policy is created in memory and used to maintain state and provide reference the necessary rules and actions for policy enforcement.

Although the invention has been particularly described with respect to a vISP, it is also applicable to other network access session policing applications such as concurrent license policing and online gaming session policing.

The invention claimed is:

1. A method of management of concurrent sessions within a networked electronic system to facilitate expansion of the networked system, comprising defining a model of the system to be managed, defining policies, which policies are applicable to components of the model, wherein system components are modelled as entities in the model with hierarchical relationships between the entities, which entities each comprise physical or non-physical objects in the system, wherein each policy includes an identifier and comprises one or more time-sensitive rules, which rules describe one or more actions to be taken if certain pre-defined conditions exist as an event, wherein the policies provide guidelines for how the entities should be managed in response to interactions between the entities within the system, the policies then being enforced in response to such interactions between entities within the system, characterised in that the networked electronic system comprises multiple servers, the model being split into parts such that policy information for a given entity is held on a nominated one of the multiple servers, with the other servers being informed of where to find the policy information, determination of which policies to apply to a given request being made by a policy checker, which policies are then executed and applied to one or more entities within the networked system.

2. A method according to claim 1, wherein the entities may comprise a plurality of physical or non-physical objects to which a common policy is applicable.

3. A method according to claim 1, wherein entities are grouped into sets having a common theme.

4. A method according to claim 1, wherein each entity is defined as local or distributed, wherein state information for a local entity is located only at a pre-defined server and associated back-up servers and wherein state information for a distributed entity is accessible to servers throughout the system.

5. A method according to claim 1, wherein representation of the model comprises views, which views relate to a single object type.

6. A method according to claim 5, wherein the views do not overlap.

7. A method according to claim 5, wherein the views comprise services, users or data.

8. A method according to claim 1, wherein the entity has one, two or many children and/or one two or many parents.

9. A method according claim 1, wherein a policy is applied to a plurality of entities such that the combination of said entities determines the application of the policy in response to a request referring to these entities.

10. A method according to claim 9, wherein when a policy is applied to a plurality of entities, said entities comprise one entity of each type.

11. A method according to claim 1, wherein a single policy definition is generated dynamically in response to a new transaction/request and applied to the object described in the request, the policy used being based upon the class of object to which the request relates.

12. A method according to claim 11, wherein, the single policy definition along with the use of object-types provides the means of applying the same policy to large numbers of objects automatically.

13. A method according to claim 1, wherein the concurrent sessions with the electronic system comprise user access sessions within the networked electronic system and the policies are defined to mandate priority of the traffic for a user with respect to bandwidth availability.

14. A method according to claim 1, wherein usage of the system components by a plurality of users is monitored and policies define what the or each user is entitled to do, which policies are defined in response to usage of system components by the or each user.

15. A networked electronic system, comprising:
multiple servers; and
a model of the networked electronic system stored on said multiple servers, said model including policies, which policies are applicable to components of the model, wherein system components are modelled as entities in the model with hierarchical relationships between the entities, which entities each comprise physical or non-physical objects in the system, wherein each policy includes an identifier and comprises one or more time-sensitive rules, which rules describe one or more actions to be taken if certain pre-defined conditions exist as an event, wherein the policies provide guidelines for how the entities should be managed in response to interactions between the entities within the system, the policies then being enforced in response to such interactions between entities within the system,
wherein the model is split into parts such that policy information for a given entity is held on a nominated one of the multiple servers, with the other servers being informed of where to find the policy information, determination of which policies to apply to a given request being made by a policy checker, which policies are then executed and applied to one or more entities within the networked system.

* * * * *